United States Patent [19]

Hill et al.

[11] 3,818,435
[45] June 18, 1974

[54] LF AMPLIFIER, LIMITER, AND FILTER SYSTEM FOR A RECEIVER OF A PNEUMATIC TIRE LOW PRESSURE MONITORING AND WARNING SYSTEM

[75] Inventors: Charles E. Hill, Lynn; William R. Brobeck, Richmond, both of Ind.

[73] Assignee: Avco Corporation, Richmond, Ind.

[22] Filed: Sept. 15, 1972

[21] Appl. No.: 289,699

[52] U.S. Cl. ................................. 340/58, 325/111
[51] Int. Cl. ........................................... B60c 23/04
[58] Field of Search ........ 340/58; 200/61.22, 61.25, 200/61.26; 325/15, 111, 117

[56] References Cited
UNITED STATES PATENTS
3,588,815    6/1971    Koonce ................................ 340/58
3,694,803    9/1972    Strenglein ........................... 340/58

Primary Examiner—Alvin H. Waring
Attorney, Agent, or Firm—Bertram H. Mann

[57] ABSTRACT

An amplifier, limiter, and filter circuit having an improved pass-band and a pneumatic tire low pressure monitoring and warning system using same is provided. The circuit comprises a multiplicity of transistors operatively connected to define stages of amplification, limiting and filter means for attenuating signals on both sides of the pass-band. The circuit includes improved limiters which in combination with the band-pass characteristics of the amplifier serves to restrict the output signals outside the LF pass band to a level which is too low to provide a warning indication. The last downstream transistor has a resistor in a circuit connected to its collector electrode and another resistor connected between its emitter and ground thereby enabling this transistor, serving as an active filter, to provide both amplification and a high pass filtering action.

7 Claims, 6 Drawing Figures

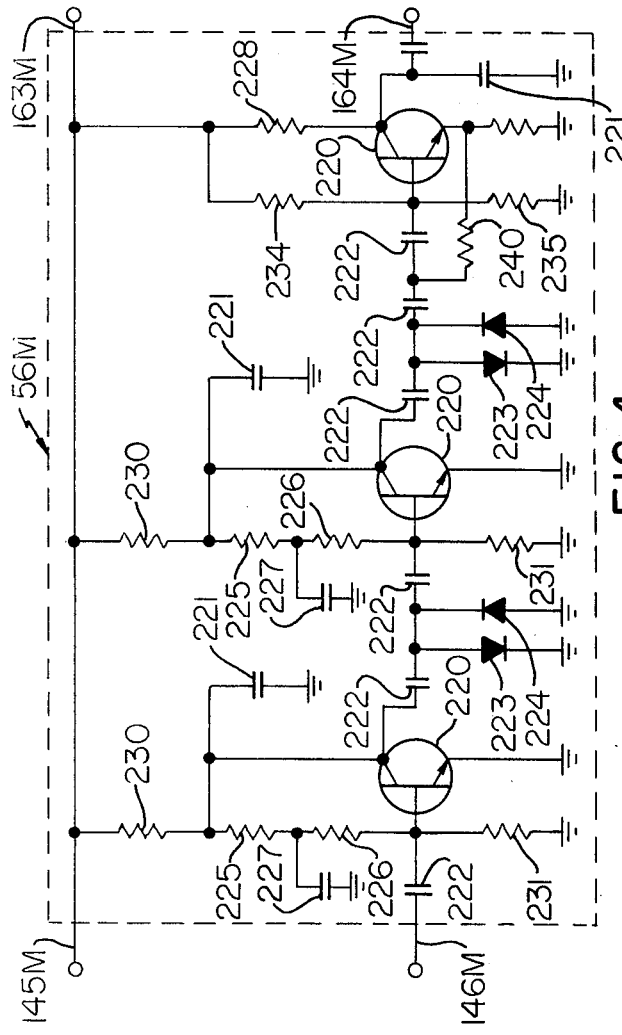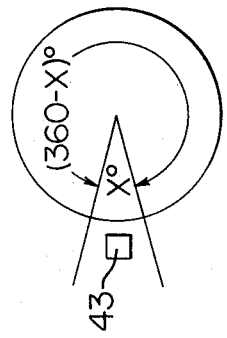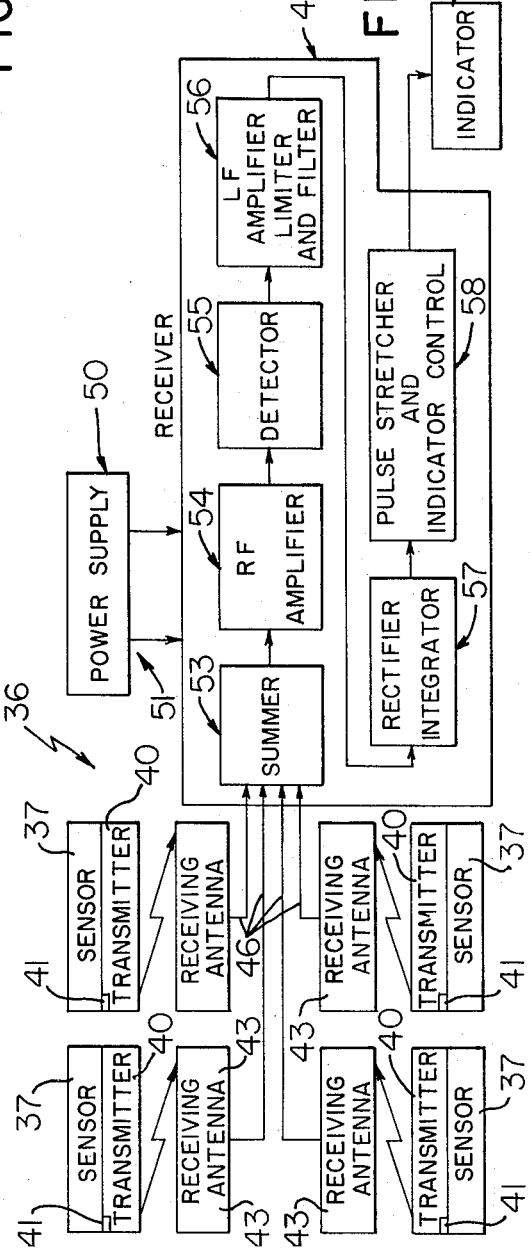

LF AMPLIFIER, LIMITER, AND FILTER SYSTEM FOR A RECEIVER OF A PNEUMATIC TIRE LOW PRESSURE MONITORING AND WARNING SYSTEM

BACKGROUND OF THE INVENTION

In a pneumatic tire low pressure monitoring and warning system having a sensor which senses a low pressure condition in a pneumatic tire supported on an associated vehicle by a rotatable support and a transmitter fixed to the rotatable support and being rotatable therewith with the transmitter being actuated by the sensor enabling it to provide pulse-modulated output signals at a radio frequency in response to a low pressure condition, it is important that a receiver associated with said transmitter reliably recognize the output signals from the transmitter.

Therefore, it is important that the receiver minimize false alarms by rejecting potentially false alarm inputs including; power supply disturbances generated by the electrical equipment of the vehicle, including the starter, horn, window washer, windshield wipers, key alarms, etc.; RF signals generated by natural atmospheric electrical disturbances such as static; RF signals generated by the above-mentioned electrical equipment of the vehicle; RF signals generated by electrical equipment external to the vehicle; voice-modulated as well as continuous-wave signals within the selected RF transmission band; and modulated as well as continuous-wave RF signals outside the selected band.

SUMMARY

This invention provides an improved amplifier, limiter, and filter circuit having an improved pass-band and a pneumatic tire low pressure monitoring and warning system which uses such circuit in a receiver thereof to substantially eliminate false alarm inputs of the character mentioned above. The circuit comprises a multiplicity of transistors operatively connected to define stages of amplification, limiting, and filter means for attenuating signals on both sides of said pass-band. The circuit includes improved limiters which in combination with the band pass characteristics of the amplifier serves to restrict the output signals outside the LF pass band to a level which is too low to provide a warning indication. The last downstream transistor has a resistor in a circuit connected to its collector electrode and another resistor connected between its emitter and ground thereby enabling the third transistor, serving as an active filter, to provide both amplification and a high pass filtering action.

Other details, uses, and advantages of this invention will be readily apparent from the embodiments thereof presented in the following specification, claims, and drawings.

BRIEF DESCRIPTION OF THE DRAWINGS

The accompanying drawings show present preferred embodiments of this invention, in which FIG. 1 is a perspective view illustrating an exemplary motor vehicle utilizing one embodiment of a pneumatic tire low pressure monitoring and warning system which employs the improved LF amplifier, limiter, and filter circuit of this invention in its receiver;

FIG. 2 is a schematic presentation of the exemplary system utilized in the vehicle of FIG. 1;

FIG. 2A is a fragmentary view of a typical assembly comprised of a sensor, transmitter, and battery comprising the system of FIG. 2 with such assembly being mounted on a hub of one of the tires of the vehicle of FIG. 1;

FIG. 2B is a schematic diagram highlighting that each receiving antenna receives a useable signal only during an angular portion of each rotation of its associated transmitter; and FIGS. 3 and 4 are schematic electrical diagrams of two embodiments of the improved electrical circuit of this invention.

DESCRIPTION OF THE OVERALL SYSTEM

Figure 3:
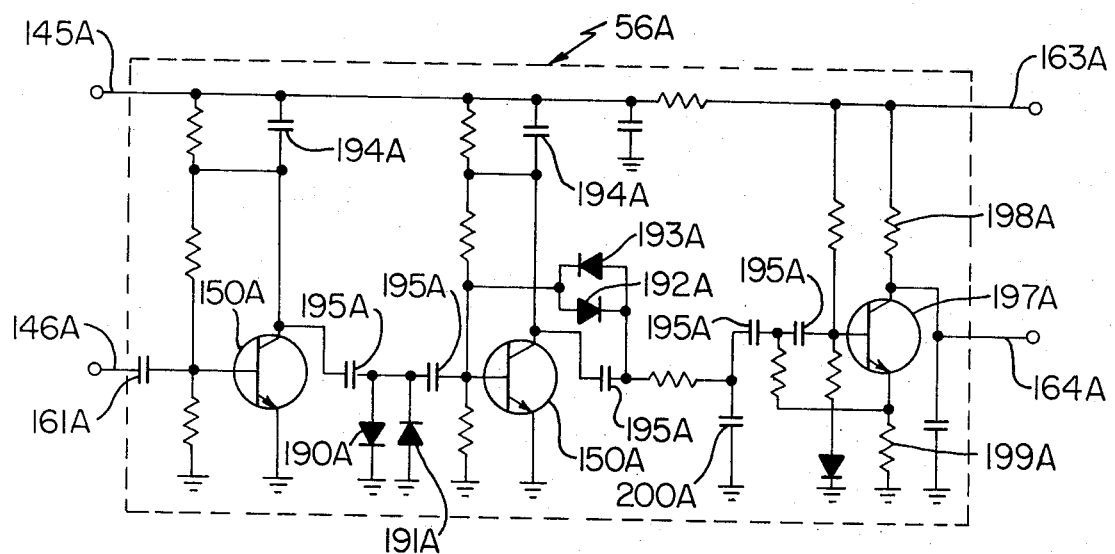

Reference is now made to FIG. 1 of the drawings which illustrates a motor vehicle shown in this example of the invention as a four-wheeled passenger automobile 30 of well known construction which has a plurality of four wheel assemblies 32 and each wheel assembly 32 is comprised of a rotatable support in the form of a hub or rim 33 with each hub 33 carrying an associated tubeless tire 34, in a well known manner, which is inflated to a predetermined pressure with a suitable fluid such as ambient air. Each wheel assembly 32 is rotatable about an associated central axis of rotation 35 whereby the associated hub 33 and tire 34 are similarly rotatable about such central axis and in a well known manner. The vehicle 30 is powered by a suitable engine which usually drives two of the wheel assemblies 32, either the front or rear two, and the vehicle 30 utilizes one exemplary embodiment of the pneumatic tire low pressure monitoring and warning system of this invention which is designated generally by the reference numeral 36 and such system serves to warn the operator of the vehicle 30 in the event of an abnormally low fluid pressure, pneumatic pressure in this example, in any one of the four tires 34 and in a manner which will be presented in detail hereinafter.

For convenience and ease of presentation the exemplary system 36 has been illustrated as being used on a vehicle in the form of passenger-type automobile having a plurality of four tubeless tires each of which is inflated to a predetermined pressure. However, it will be appreciated that the system is fully applicable to all types of vehicles employing either tubeless or tube-type pneumatic tires, or the like, including buses, trucks, trailers, and similar vehicles.

The system 36 comprises a plurality of four sensing means or sensors 37, see FIG. 2, and each sensor 37 is carried by an associated wheel assembly 32 and is preferably suitably installed on the hub 33 of its associated wheel assembly in a fixed manner. The detailed construction and operation of a typical sensor 37 will be presented subsequently.

The system 36 comprises a plurality of transmitters 40, each operatively connected to and being activated or actuated by an associated sensor 37 and in this example the sensor 37 and transmitter 40 associating with a particular wheel assembly 32 is provided with a self-contained power source in the form of a battery 41 and the sensor 37, transmitter 40, and battery 41 of each particular wheel assembly is provided as a single unit or assembly which is designated generally by the reference numeral 42, see FIG. 2A. The assembly 42 may be suitably installed within its associated hub 33 by threaded bolt, welding, or the like, and as a practical matter the assembly 42 and hence its transmitter 40 is located at a position which is radially displaced by a distance D from the central axis of rotation 35 of its wheel assembly 32, see FIGS. 1 and 2A.

The sensor 37 is comprised of a sealed pressurized hemispherical dome which dimples in a substantial predetermined manner when it is exposed to an external pressure greater than a predetermined minimum. The dimple action serves as a normally open electric snap switch which closes by "oil can" action whenever the external pneumatic pressure falls below the predetermined minimum pressure which in reality is the minimum air pressure required to assure satisfactory operation of the associated tire 34.

The transmitter 40, which will also be referred to as oscillator 40, is actuated by the snap action of its sensor 37 whereby the associated battery 41 provides electrical power for the oscillator 40. The oscillator 40 is a self-pulsed oscillator which generates a radio frequency (RF) signal with distinct, readily identifiable characteristics to eliminate false alarms. The oscillator utilizes a tank circuit having a coil which is unshielded and unobstructed to the greatest extent possible to establish an external magnetic alternating near field and thereby use such coil as the transmitting antenna. Each transmitter 40 operatively associates with an associated one of four fixed receiving antennas 43 comprising the system 36 and the antennas 43 will be described in detail subsequently.

For certain applications where it may be desired to take advantage of the minimal licensing requirements in the so-called citizen's band of radio frequencies ranging between 26.97 – 27.27 megahertz (Mhz), the oscillator frequency may be located within this band and the transmitter 40 then utilizes near field transmission. The median frequency in this band is 27.12 Mhz which corresponds to a wave length of 36.26 feet and such distance is considerably greater than the distance required for the system 36 of this invention to span from a hub 33 of any particular wheel assembly 32 of a vehicle using system 36 to a location on such vehicle where an antenna for the system is likely to be located.

The use of near field transmission has the distinct advantages that in the near field zone the stationary field is of greater magnitude than the traveling field, and attenuation of the stationary field per unit of distance is greater than that for the traveling field whereby interference with adjacent electrical apparatus as well as the electrical apparatus of the vehicle 30 is minimized. Further, because transmission basically may be considered as the coupling between a stationary coil on a receiving antenna 43 and a rotating coil of an associated transmitter 40, such transmission will be controlled by the coupling factor whereby maximum magnetic coupling will provide maximum transmission.

Because of practical considerations of economy and simplicity in detecting a low pressure condition in a rotating pressurized tire, each transmitter assembly 42 and its transmitter 40 is preferably located off center, as indicated earlier, by the distance D from the central axis of rotation 35 of its associated wheel assembly 32 and hub 33. However, the assembly 42 is of small weight (roughly an ounce) and the weight thereof may be easily balanced by a regular small size automobile tire balancing weight, if desired.

With off center mounting, the previously mentioned coupling factor between a rotating transmitter 40 and the fixed coil of its receiving antenna 43 varies considerably as each wheel assembly rotates because of the variation in distance between such coils, changes in relative orientation between the coils, and the difference in shielding interposed between the coils at different relative positions thereof. As a result of these factors the transmitted output signal from the transmitter 40 is of sufficient strength to be useable only during a portion of each revolution or rotation of its wheel assembly 32. Stated in another manner, because each receiving antenna 43 is attached at a fixed position on the vehicle adjacent its wheel assembly 32, the antenna 43 receives a useable output signal from the transmitter only during a portion of each complete rotation of the transmitter therepast. However, since it is known that the magnetic near field varies inversely as the third power of distance, then the received signal during part of the rotation will be substantially stronger than the received signal would be if a more constant transmission distance was selected. The system 36 utilizes a receiver 45 which is operatively connected to each receiving antenna 43 by an associated coaxial cable 46 and the receiver employs unique means for increasing the effective time duration of the useable portions of the output signals from the transmitter 40 to activate or otherwise energize an associated indicator 47 comprising system 36 and such indicator is operatively connected to the receiver 45 in a manner to be described.

The indicator 47 may be of any suitable type. For example, such indicator may be in the form of a light which is observed visually or such indicator may be in the form of an audible indicator such as a bell or buzzer.

The system 36 in addition to the batteries 41 comprising assemblies 42, also has a power source for its receiver 45 and such power source is designated generally by the reference numeral 50 and is suitably operatively connected to the receiver 45 as illustrated at 51. The power source 50 may comprise any suitable source of power and in this example is the usual battery provided for the vehicle 30.

Each transmitter 40 is energized by a low pressure indication as determined by its sensor 37 and will provide continuous pulsed output signals. In general, only during certain time intervals associated ones of these signals are of sufficient strength that they are readily received by an associated receiving antenna 43 and as will now be explained particularly in connection with FIGS. 1 and 2B.

Under conditions wherein the vehicle 30 is standing still, the signal from a transmitter 40 is processed through the receiver 45 and may activate the indicator 47, such as an indicator lamp 47, so that the lamp 47 is ON or OFF depending upon the relative location of the transmitter 40 and receiving antenna 43. In those instances when the vehicle 30 is moving at a relatively low speed, the indicator lamp 47 will be turned ON and OFF sequentially; however, it has been found that the lamp 47, in this case, is turned ON for a sufficiently long time interval to assure full brightness and, conversely, when such lamp is turned OFF it is extinguished completely. With the vehicle moving at such slow speeds, the pulse of light will therefore be fully visible and the low pressure repetition rate will result in a flickering action by the lamp 47. If the vehicle 30 is moving at higher speeds the lamp 47 may be turned ON for a time period which is insufficient to insure full brightness. This performance of the lamp at higher vehicle speeds in combination with the higher pulse repetition rate due to faster rotation reduces the flickering; however, the total perceptible light may be inadequate to be used as an indicator.

To highlight this situation reference is made to FIG. 2B of the drawings wherein it is seen that for each full rotation of a wheel the transmission level is high enough to activate or light the indicator lamp 47, for X degrees while such lamp is dark for the remaining (360–X) degrees. By way of an example, X may be 30 degrees, in which case the indicator lamp will be dark for a period roughly 11 times as long as the lighted period. Thus, it can be readily seen that an operating transmitter 40 used in a pneumatic tire of a given size will generate a signal having a particular pulse frequency determined by the emission characteristics of the transmitter and the speed of the vehicle. It is also apparent that the performance of the indicator 47 may be substantially improved if the indicator ON time or the time that it is activated is increased relative to its OFF time. In particular, the performance of the indicator 47 may be substantially improved if the effective time duration of a useable signal received by each receiving antenna 43 is increased and this may be achieved by a technique referred to popularly as pulse stretching and means for achieving such pulse stretching is provided in the receiver 45.

The receiver 45 minimizes false alarms by rejecting potentially false alarm inputs including; power supply disturbances generated by the electrical equipment of the vehicle 30, including the starter, horn, window washer, windshield wipers, key alarms, etc.; RF signals generated by natural atmospheric electrical disturbances such as static; RF signals generated by the above-mentioned electrical equipment of the vehicle 30; RF signals generated by electrical equipment external to the vehicle; voice-modulated as well as continuous-wave signals within the selected RF transmission band; and modulated as well as continuous-wave RF signals outside the selected band. Conversely, the RF receiver 45 very reliably recognizes and activates the indicator 47 when receiving a pneumatic tire low pressure warning signal in the form of an RF signal having all of the following characteristics of being in the selected RF band, being an RF signal which is pulsating at the predetermined frequency defined by the self-pulsed oscillator, and being an RF signal which is pulsating at a rate and with a pulse width determined by the angle X of rotation over which a recognizable signal is received in combination with the rotational velocity of an associated wheel assembly 32 of the vehicle 30.

The receiver 45 has an RF pass band which is reduced to a minimum compatible with assured inclusion of the selected RF band under all environmental conditions and has means minimizing or eliminating the above-mentioned false alarm inputs while assuring recognition of a signal indicating a low tire pressure and as will be apparent from the following description. In particular, the receiver 45 has a summer 53 which receives RF signals from an RF transmission line 46 in the event of a low pressure condition in a vehicle tire associated therewith and such signals are then fed to an RF amplifier 54. The amplifier 54 employs a plurality of two transformer coupled stages having tuned primaries and untuned secondaries to amplify the RF signal whereby RF amplification is held at a minimum in view of its relatively high cost and regeneration problems usually associated therewith. The signals from the RF amplifier 54 are fed to a diode amplitude detector 55 which is forward biased to facilitate its ability to perform at very low signal levels and the detector 55 is followed by a low frequency (LF) amplifier, limiter, and filter circuit 56 which serves to attenuate undesired signals. The circuit 56 is a combination LF limiter/band pass amplifier which prevents LF signals on frequencies outside the predetermined frequency band of the oscillator from reaching a level which may activate the indicator. The circuit 56 is followed by a rectifier-integrator circuit 57 which integrates the LF pulses in the pulse train. This circuitry will assure that a pulse train rather than noise spikes is required to activate the indicator while the shortest authentic pulse train will suffice to let the rectified voltage reach a level which will activate succeeding or downstream circuits in the receiver. The circuit 57 thus serves to eliminate the effect of noise spikes and provides more reliable operation the longer the required integration time can be made. The circuit 57 is followed by a pulse stretcher and indicator control circuit 58 and this circuit is particularly useful in overcoming the effect of short trains of pulses. The circuit 58 serves as means for increasing the effective time duration of useable ones of the output signals provided to RF receiver 45 by receiving antennas 43 and insures that a satisfactory indicator signal is provided to the indicator 47, to present a distinct indication. The pulse stretcher 58 is inherently a regenerative device whereby it also increases the sensitivity of the RF receiver since any signal which is capable of activating the pulse stretcher will provide a saturated output signal. The circuit 58 activates indicator 47 to warn the operator of the vehicle 30 in the event of a low pressure condition in any one of the vehicle tires. The receiver 45 also has suitable means in its power supply 50 for filtering such power supply to reduce power supply line disturbances to a tolerable level.

Having described the general operation of the system 36 in connection with exemplary vehicle 30 a detailed description will now be presented of two other exemplary embodiments of LF amplifier, limiter, and filter circuits designated generally by the reference numerals 56A and 56M respectively which may be used in the receiver 45 substantially interchangeably with the circuit 56 with minor modifications of adjoining circuits and with such modifications being easily made by those skilled in the art.

LF AMPLIFIER LIMITER AND FILTER CIRCUIT 56M

The circuit 56M is illustrated in FIG. 4 and utilizes suitably located signal limiters combined with high and low frequency filters to restrict the frequency band within which the LF signals are capable of reaching a threshold level which will activate the indicator 47. The circuit 56M utilizes an active filtering action designed to provide a low frequency cutoff normally referred to as a "knee" at approximately 28 KC. In addition, all coupling capacitors have been made marginal in capacitance value to obtain a maximum of low frequency attenuation, as will be apparent hereinafter.

The circuit 56M by way of an example utilizes a plurality of three amplifier stages in the form of three transistors or amplifiers each designated by the reference numeral 220. The amplifiers 220 have their collector or output electrode circuits loaded by capacitors in the form of capacitors 221. Each capacitor 221 is connected between the collector or output electrode of its associated transistor or amplifier and ground and the capacitors 221 attenuate or block out frequency response which is beyond or higher than the operational frequency range of input pulses. The cooperating arrangement of components associated with the amplifiers 220 is such that the gain of the last amplifier 220 is about half the gain of the first amplifier 220 in the circuit.

The circuit 56M employs a plurality of coupling capacitors each designated by the reference numeral 222 which serve to attenuate or block out the low frequency signals. A capacitor 222 is connected upstream of the base of each amplifier 220 while another capacitor 222 is connected to the collector of each amplifier 220.

The circuit 56M also employs a pair of diodes 223 and 224 between the first and second amplifiers 220 and another pair of diodes also designated 223 and 224 between the second and third amplifier and each set of diodes 223 and 224 limits the magnitude of the signal to circuit 56M by holding the voltage within a limit determined by the characteristics or properties of the diodes whereby each pair of diodes 223 and 224 protects its downstream amplifier 220 from a signal that is too large.

The circuit 56M also has a bleeder circuit from the collector of the first amplifier 220 to the base of such amplifier and such bleeder circuit is comprised of resistors 225, 226, 230 and 231 decoupled by a capacitor 227. Similarly, the second amplifier 220 has a bleeder feedback circuit from its collector to its base which includes resistors also designated 225, 226, 230 and 231 and a decoupling capacitor 227. It is to be understood that the components 225–227 for each amplifier 220 need not necessarily have the same value.

The circuit 56M also provides a DC bias to each amplifier 220 in the circuit and for the first amplifier 220 such DC bias is provided by resistors 225 and 226 as well as resistors 230 and 231. Similarly, DC bias to the second amplifier 220 is provided by its associated resistors 225 and 226 as well as resistors 230 and 231.

The circuit 56M has a third LF amplifier stage utilizing a third transistor 220, which also serves as an active high pass filter. The active filter is conventional as outlined in "A Practical Method of Designing RC Active Filters," R. P. Sallen and E. L. Key, IRE Transactions — Circuit Theory, Mar. 1955. The associated circuit provides a resistor 228 in the circuit from the collector of the third transistor 220 and a resistor 240 between its emitter and ground thereby enabling the third amplifier or transistor 220 to provide both a high pass filter and amplification. DC bias is provided by resistors 234 and 235.

Thus, it is seen that the circuit 56M provides the desired amplification, limiting and filtering while assuring that a control signal is transmitted only within a closely controlled band and that false alarms, or the like, are substantially eliminated. Circuit 56M may be connected to circuit 55 by lead 146M and ground and to circuit 57 by lead 164M and ground. Power to circuit 56M is supplied by lead 163M and a power lead 145M is connected between circuit 56M and circuit 55.

LF AMPLIFIER, LIMITER, AND FILTER 56A

The LF amplifier, limiter, and filter circuit 56A is shown in FIG. 3 and has, by way of example, two stages of amplification employing transistors or amplifiers 150A and limiting circuitry which has been strengthened substantially by two diodes 190A and 191A parallel connected in opposition as a variable load between the LF amplifiers 150A. With this circuit configuration the known diode characteristics will produce a resistive impedance which is far greater for small positive and negative voltages than for greater values. Accordingly, when this diode configuration is inserted as a shunt element in a coupling link it will effectively limit positive and negative voltage excursions and thereby limit the signal amplitude as required. In addition, two diodes 192A and 193A have been parallel connected in opposition and connected as a degenerative feedback path in the circuit between the collector and base of the second amplifier 150A. When used in this circuit the high impedance of the diode configuration will effectively eliminate degeneration for small negative and positive voltages. However, the degeneration and therefore the limiting action becomes much more effective at greater voltage excursions.

The collector load resistances of both LF amplifier stages or transistors 150A are capacitance-loaded by capacitors 194A to minimize the frequency response beyond or above the frequency band of the transmitter 40. The circuit 56A also has a plurality of coupling capacitors 195A in addition to coupling capacitors 161A and the values of coupling capacitors comprised of capacitors 161A and 195A are held to a minimum to reduce the LF response below the pulse frequency band of the transmitter 40.

The circuit 56A has a third LF amplifier stage utilizing a transistor or amplifier 197A which also serves as a high-pass active filter. The transistor 197A supplements the filtering of high frequencies provided by the joint action of capacitors 194A and a grounded capacitor 200A connected to the base of the transistor 197A. The associated circuit for transistor 197A provides a resistance in the form of resistor 198A in the circuit from the collector of amplifier 197A and a resistor 199A between its emitter and ground thereby enabling the amplifier 197A to provide both amplification and a highpass filtering action. The added limiting and filtering of circuit 56A results in a better defined LF passband. The circuit 56A may be connected to circuit 55 by lead 146A and ground and to circuit 57 by lead 164A and ground. Power to circuit 56A is supplied by a lead 163A and a power lead 145A is connected between circuit 56A and circuit 55.

While present exemplary embodiments of this invention, and methods of practicing the same including the use of conventional transistors, have been illustrated and described, it will be recognized that this invention may be otherwise variously embodied and practiced within the scope of the following claims.

What is claimed is:

1. An LF amplifier, limiter and filter system for an RF receiver of a pneumatic tire low pressure monitoring and warning system comprising; means sensing a low pressure condition in a pneumatic tire carried on an associated vehicle by a rotatable support; a transmitter fixed to said rotatable support and being rotated therewith; said transmitter being actuated by said sensing means to provide radio frequency pulsed output signals within a preselected radio frequency band, with a pulse repetition rate within a preselected pulse frequency band, in response to said low pressure condition; a receiving antenna attached at a fixed position on said vehicle adjacent said tire; a receiver; a transmission line operatively connecting said receiving antenna to said receiver; indicating means operatively connected to said receiver and being activated thereby; amplitude detection means for demodulating said pulse modulated radio frequency signals; and and LF amplifier, limiter and filter circuit in said receiver which amplifies said pulsed output signals to provide efficient activation of said indicating means in response to said low pressure condition, said circuit comprising a multiplicity of amplifier stages, filter means for attenuating signals on frequencies on both sides of said preselected pulse frequency band and amplitude limiting means in cooperation restricting signals on frequencies outside said pass-band from exceeding the preselected threshold required to activate said indicator.

2. An LF amplifier, limiter and filter system for an RF receiver as set forth in claim 1 wherein the last downstream stage of said amplifier stages comprises a high-pass active filter and also functions as a voltage amplifier.

3. An LF amplifier, limiter and filter system for an RF receiver as set forth in claim 2 wherein said active high-pass filter comprises: a passive input circuit and a transistor having a resistor connected in a circuit connected to its collector electrode to provide an output circuit and another resistor connected between its emitter electrode and ground to provide a feedback circuit to said passive input circuit which is connected to its base electrode, thereby enabling said high-pass active filter to provide both amplification and filtering.

4. An LF amplifier, limiter and filter system for an RF receiver as set forth in claim 3 wherein said filter means of said circuit comprises a plurality of coupling capacitors operatively connected between said amplifier stages and selected so as to attenuate signals below said pass-band and loading capacitors connected from the output electrodes of the active elements of said amplifier stages; said loading capacitors selected so as to attenuate signals above said pass-band.

5. An LF amplifier, limiter and filter system for an RF receiver as set forth in claim 4 in which said circuit further comprises a pair of diodes parellel connected in opposition to ground between the first and second stages of said amplifier stages; said pair of diodes serving to limit the magnitude of signals provided to said second stage.

6. An LF amplifier, limiter and filter system for an RF receiver as set forth in claim 5 in which said circuit further comprises a second pair of diodes parallel connected in opposition to ground between the second and third stages of said amplifier stages, said second pair of diodes limiting the magnitude of signals provided to said third stage.

7. An LF amplifier, limiter and filter system for an RF receiver as set forth in claim 5 and further comprising a second set of diodes parallel connected in opposition as a degenerative feedback path between the output and input circuits of the second stage of said amplifier stages thereby limiting the magnitude of signals provided to the third stage by reducing the gain of said second stage except for a limited output voltage range.

* * * * *